May 11, 1954     P. O. ENGELDER     2,677,964
FLUID LEVEL INDICATING AND CONTROLLING DEVICE
Filed June 4, 1951
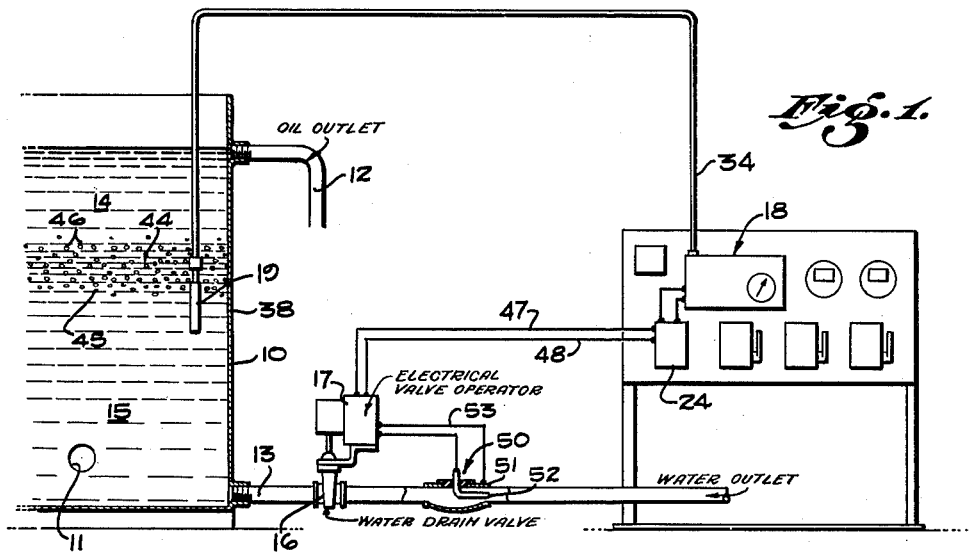
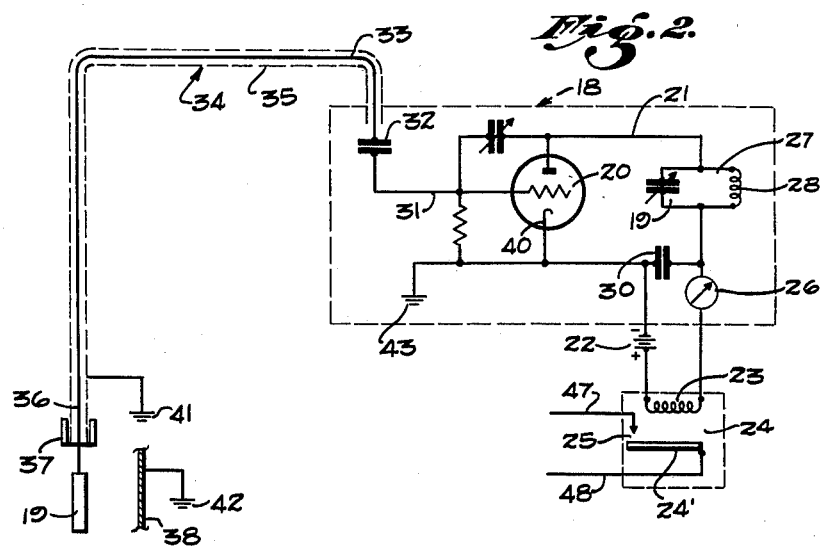
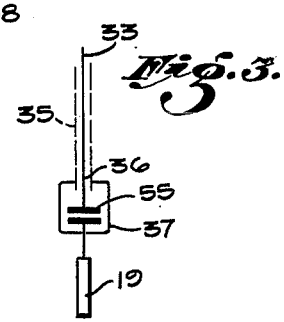
PAUL O. ENGELDER,
INVENTOR.
BY
ATTORNEY Patented May 11, 1954

2,677,964

UNITED STATES PATENT OFFICE 2,677,964

FLUID LEVEL INDICATING AND CONTROLLING DEVICE

Paul O. Engelder, Long Beach, Calif., assignor of one-half to George H. Ennis and one-half to Robert V. Funk, Long Beach, Calif.

Application June 4, 1951, Serial No. 229,790

5 Claims. (Cl. 73—304)

My invention relates in particular to means for determining and/or regulating the quantity of liquids in containers, such as tanks, and relates in particular to a simple and dependable electronic means for controlling and indicating the level of a liquid of low impedance in containers. The invention is of particular utility in the oil producing industry and for the purpose of explaining the features of the invention the present application will be directed to an embodiment designed for indicating and controlling the quantity of water or aqueous solution in a separating tank which receives oil and water production from wells.

The present invention is an improvement on the device disclosed in the copending application of George H. Ennis and William Walter Ennis for Tank Bleeder, Serial No. 783,598, filed November 1, 1947 now Patent No. 2,573,172. It is an object of the present invention to produce a device of greater sensitivity, yet requiring fewer parts and fewer places at which adjustments are made in arranging the device for use.

It is a further object of the invention to provide a device for indicating and controlling the quantity of water in a tank which device has parts so arranged that the sensing means thereof may be placed at considerable distance, for example 100 to 300 feet from the indicating or control station, without the necessity of employing a tuned circuit at the position at the sensing means.

The present invention comprehends an electronic device of the character set forth in the preceding paragraph having a simple and small sensing means which may be placed in relatively inaccessible places, which avoid the use of an oscillator circuit or reactance coupling adjacent the electrode of the sensing means, and which does not require adjustment of the sensing means after installation of the device.

It is a further object of the invention to provide an electronic indicating and controlling means for the quantity of a liquid in a container, which has an electron tube with a plate circuit having therein a high frequency tuned circuit and wherein the grid circuit does not require an oscillatory circuit consisting of an inductance coil and a capacitor connected in parallel.

It is a feature of the invention that the grid circuit of the electron tube consists simply of a coaxial cable connected at one end to the electron tube and having the other end thereof extended into the container, with the inductive reactance necessary for oscillation being furnished not by a parallel combination of lumped inductance and capacitance, but solely by the coaxial line itself and the correlated high impedance at the terminus of the coaxial cable. Also with this device the length of the coaxial cable is such that the effective length of the line corresponds to an integral number of half-wave lengths corresponding to the frequency of the oscillator circuit which is connected into the filament-plate circuit of the electron tube.

Further objects and advantages of the invention may be brought out in the following part of the specification wherein I have described a preferred embodiment of the invention in detail, not for the purpose of limiting the scope of the invention set forth in the appended claims, but for the purpose of completely disclosing the invention.

Referring to the drawing which is for illustrative purposes only:

Fig. 1 is a schematic view showing the manner in which the invention is used to indicate and control the quantity of water in an oil-water separating tank;

Fig. 2 is an electrical diagram of the electronic indicating and controlling device of the invention; and Fig. 3 is a fragmentary diagram showing a means for reducing the sensitivity of the device.

In Fig. 1, I show a separating tank 10 which receives the oil and water production from a well through an inlet 11. Oil outlet piping 12 is connected to the upper portion of the tank 10 and water outlet piping 13 is connected to the lower portion of the tank 10. The oil 14 which separates from the water 15 in the tank 10 overflows through the piping 12, and when the water 15 reaches a predetermined level in the tank 10 a valve 16 in the piping 13 is opened by a valve operating device 17 under control of an indicating and controlling device 18 explained in detail in the following description of Fig. 2, and having a sensing element 19 disposed within the tank 10 at an intermediate elevation.

The indicating and controlling device 18, as shown in Fig. 2, includes an electron tube 20 having a plate circuit 21 including a source of electrical potential or energy shown as a battery 22, an electro-magnet coil 23 of an electro-responsive device 24, comprising a relay switch 25, an indicating means consisting of a meter 26 and an oscillatory circuit 27 comprising an inductor 28 and a capacitor 29 connected in parallel. The plate circuit 21 is bridged by a condensor 30. The relay switch 25 includes an armature 24' the movement of which is an indication of water reaching an elevation in the container, this armature also actuating the control switch 25.

A grid circuit is provided which includes a conductor 31 connected through a direct current blocking condensor 32 with the internal conductor 33 of a coaxial cable 34 having a sheath 35 indicated by broken lines. The coaxial cable 34 is extended into the tank 10 to an intermediate level adjacent a wall of the tank 10. The end 36 of the conductor 33 within the tank 10 is extended through an insulator 37 at the end of the sheath 35 to make connection with the sensing element 19 disclosed as an electrode spaced from the wall 38 of the tank 10, the cable sheath 35, the wall 38 and the filament 40 of the tube 20 being electrically connected by the ground connections 41, 42, and 43. The transmission line consisting of the conductor 33 enclosed in the sheath 35 is of a length corresponding to an integral number of half-wave lengths of the oscillating current produced in the electronic unit.

In view of the fact that the sheath 35 and the wall 38 of the tank 10 are grounded, the wall of the tank 10 constitutes a continuation of the sheath 35, so that the fluid in the tank 10 between the electrode 19 of the wall 38 of the tank is in the grid circuit of the tube and constitutes the terminating impedance of the coaxial line, which in turn constitutes the impedance presented to the grid of the vacuum tube, without the need for a combination of lumped inductance and capacitance.

As indicated in Fig. 1, a layer of oil-water emulsion 44 ordinarily occupies a position between the upper face 45 of the water 15 and the lower face 46 of the body of oil 14 in the tank 10. When the lower face 46 of the non-polar liquid or solution, oil 14 is below the lower end of the electrode 19, so that the non-polar solution occupies the position between the electrode 19 and the wall 38, the impedance in the grid circuit will be high and will be predominantly an inductive reactance, thus fulfilling the conditions for oscillation with the results that the current drawn by the oscillator will be extremely small and the meter will indicate that the lower level of the oil 14 is below the electrode 19. As the water level rises thereafter, the emulsion 44 will be brought into the gap between the electrode 19 and the wall 38, the particles of water in the emulsion 44 lowering the impedance in the grid circuit and throwing the oscillator somewhat out of balance so that the current flow from the battery 22 will increase, and the meter 26 will indicate the level 45 of the water body 15. When the water level 45 further rises so that the electrode 19 is completely submerged in water the impedance of the grid circuit will be so low that oscillation of the tube 20 will be inhibited and there will be a maximum current flow through the meter 26.

At a selected point in the increase in current flow from the battery 22, the magnitude of the electrical flux magnetism in the coil 23 will actuate the switch 25 so that there will be current flow through the conductors 47 and 48 which extend to the valve operating device 17, causing the same to open the valve 16 and drain water from the tank 10 through the piping 13, this drainage of water from the tank 10 continuing until the water level drops in the tank to such an elevation that a predetermined oscillation through the tube is accomplished and the reduction in the current flow through the coil 23 results in the opening of the switch 25. The valve operating device 17 has safety means 50 associated therewith as described in said copending application, Serial No. 783,598, this safety means including electrodes 51 and 52 in the water outlet piping 13. When the water outlet piping 13 is filled with water, the water between the electrodes 51 and 52 completes an electrical control circuit 53. Should, for any reason, the water level drop so low in the tank 10 as to permit oil 14 to flow out through the piping 13, the oil will displace the water from the gap between the electrodes 51 and 52, breaking this control circuit 53, which will result in the immediate closing of the valve 16 by the valve operating device 17.

In some types of installations reduction of the pronounced sensitivity of the device may be desired so that there will be an increase in the change in level required to actuate the indicator member 24'. As shown in Fig. 3, an impedance 55 of capacitor type is inserted between the end 36 of the conductor 33 and the electrode 19.

I claim:

1. In an oscillatory device of the character described responsive to the level of a liquid in a container: an electron tube; a plate circuit for said tube having an oscillator circuit coupled thereto, and a source of electrical potential; a grid circuit for said tube comprising a coaxial cable having conductor parts consisting of an internal conductor and sheath insulated from said internal conductor, one of said conductor parts being connected to the filament of said tube and the other of said conductor parts being connected through a direct current blocking means to the grid of said tube, said coaxial cable being extended into said container said sheath thereof being grounded to a metal container wall and said internal conductor of said coaxial cable having an electrode coupled thereto for engagement with said liquid in said container so that said electrode, said wall and liquid therebetween will form a variable impedance for said grid circuit at the terminus of said coaxial conductor, the relation of said oscillator circuit and said coaxial cable being such that the length of said coaxial cable is an integral number of half-wave lengths corresponding to the frequency of said oscillator circuit; and electrical means coupled to said plate circuit and responding to changes in electrical flow therein as the oscillation of said tube varies.

2. In an oscillatory device of the character described responsive to the level of a liquid in a container: an electron tube; a plate circuit for said tube having an oscillator circuit coupled thereto, and a source of electrical potential; a grid circuit for said tube comprising a coaxial cable having conductor parts consisting of an internal conductor and a sheath insulated from said internal conductor, said sheath of said coaxial cable being connected to the filament of said tube and said internal conductor being connected through a direct current blocking means to the grid of said tube, said coaxial cable being extended into said container said sheath thereof being grounded to a metal container wall and said internal conductor of said coaxial cable having an electrode connected thereto for engagement with said liquid when the level thereof rises in said container so that said electrode, said wall and liquid therebetween will form a variable impedance for said grid circuit at the terminus of said coaxial conductor, the relation of said oscillator circuit and said coaxial cable being such that the length of said coaxial cable is an integral number of half-wave lengths corresponding to the frequency of said oscillator circuit; and electrical means coupled to said plate circuit and responding to changes in electrical flow therein as the oscillation of said tube varies.

3. In an oscillatory device of the character described responsive to the level of a liquid in a container: an electron tube; a plate circuit for said tube having an oscillator circuit coupled thereto, and a source of electrical potential and meter; a grid circuit for said tube comprising a coaxial cable having conductor parts consisting of an internal conductor and a sheath insulated from said internal conductor, one of said conductor parts being connected to the filament of said tube and the other of said conductor parts being connected through a direct current blocking means to the grid of said tube, said coaxial cable being extended into said container said sheath thereof being grounded to a metal container wall and said internal conductor of said coaxial cable having a vertically elongated electrode connected thereto for engagement with said liquid when the level thereof rises in said container so that said electrode, said wall and liquid therebetween will form a variable impedance for said grid circuit at the terminus of said coaxial conductor, the relation of said oscillator circuit and said coaxial cable being such that the length of said coaxial cable is an integral number of half-wave lengths corresponding to the frequency of said oscillator circuit; and electrical means coupled to said plate circuit and responding to changes in electrical flow therein as the oscillation of said tube varies.

4. In an oscillatory device of the character described responsive to the level of a liquid in a container: an electron tube having a cathode, a grid and an anode plate; a plate circuit for said tube having an oscillator circuit, and a source of electrical potential; a grid circuit for said tube including a coaxial cable, one end of which is extended into said container, having an internal conductor and sheath insulated from said internal conductor, said grid circuit comprising first and second circuit parts the first of which includes the sheath of said cable and the second of which includes the internal conductor of said cable and an electrode disposed at the extended end of said cable and being coupled to said internal conductor, said first circuit part including means to form an electrode in spaced relation to said first named electrode, one of said conductor parts being coupled to the cathode of said tube and the other of said conductor parts being coupled to the grid of said tube, the relation of said oscillator circuit and said coaxial cable being such that the length of said coaxial cable is an integral number of half-wave lengths corresponding to the frequency of said oscillator circuit; and electrically responsive means coupled to said tube and responding to electrical changes involved in the oscillation of the oscillatory device as the level of the liquid moves vertically with relation to said electrodes.

5. In an oscillatory device of the character described responsive to the level of a liquid in a container: an electron tube having a cathode, a grid and an anode plate; a plate circuit for said tube having an oscillator circuit, and a source of electrical potential; a grid circuit for said tube including a coaxial cable, one end of which is extended into said container having an internal conductor and sheath insulated from said internal conductor, said grid circuit comprising first and second circuit parts the first of which includes the sheath of said cable and the second of which includes the internal conductor of said cable and an electrode disposed at the extended end of said cable and being coupled to said internal conductor, said first circuit part including means to form an electrode in spaced relation to said first named electrode, one of said conductor parts being coupled to the cathode of said tube and the other of said conductor parts being coupled to the grid of said tube, the relation of said oscillator circuit and said coaxial cable being such that the length of said coaxial cable is an integral number of half-wave lengths corresponding to the frequency of said oscillator circuit; and electrically responsive means coupled to said plate circuit and responding to the changes in current flow therein resulting from the changes in the oscillation of the oscillatory device as the level of the liquid moves vertically with relation to said electrodes.

References Cited in the file of this patent

UNITED STATES PATENTS

| Number | Name | Date |
|---|---|---|
| 2,300,562 | Freystedt | Nov. 3, 1942 |
| 2,354,964 | Ostermann | Aug. 1, 1944 |
| 2,519,668 | Konigsberg | Aug. 22, 1950 |
| 2,573,172 | Ennis | Oct. 30, 1951 |